(12) United States Patent
Yun

(10) Patent No.: US 6,458,305 B1
(45) Date of Patent: Oct. 1, 2002

(54) METHOD FOR PRODUCING COLORED SCULPTURESQUE POLYRESIN MODEL AND PRODUCT PRODUCED THEREBY

(76) Inventor: Chu Hsiao Yun, 9F, No. 219, Sec. 3, Pa-Te Road, Taipei (TW)

( * ) Notice: Subject to any disclaimer, the term of this patent is extended or adjusted under 35 U.S.C. 154(b) by 0 days.

(21) Appl. No.: 09/863,580

(22) Filed: May 21, 2001

(51) Int. Cl.[7] .............................................. B29C 33/38
(52) U.S. Cl. ...................... 264/219; 29/527.1; 264/299
(58) Field of Search ................................ 264/219, 220, 264/299; 29/527.1

(56) References Cited

U.S. PATENT DOCUMENTS

| | | | | |
|---|---|---|---|---|
| 779,979 A | * | 1/1905 | Walter | 264/220 |
| 928,061 A | * | 7/1909 | Mitats | |
| 1,038,115 A | * | 9/1912 | Gillies | 264/220 |
| 2,846,742 A | * | 8/1958 | Wagner | 264/220 |
| 3,548,050 A | * | 12/1970 | Mozer | 264/220 |
| 3,811,627 A | * | 5/1974 | Bradbury et al. | 241/281 |
| 4,160,003 A | * | 7/1979 | Kozuka et al. | 264/87 |
| 5,244,620 A | * | 9/1993 | Uchiyama | 264/220 |

* cited by examiner

*Primary Examiner*—Allan R. Kuhns
(74) *Attorney, Agent, or Firm*—Pro-Techtor International Services

(57) ABSTRACT

A method for producing sculpturesque polyresin models in horticulture use includes the following steps. First, a prototype (21) is directly made of sand stone. Then a mold (22) is made according to the shape of the prototype (21). The raw material of sculpturesque polyresin models including polyresin, hardeners, sand, cement and colored powders is then mixed together. After that, the polyresin mixture (23) is liquefied to a phase (24) and injected into the mold. The liquefied polyresin mixture (23) in the mold is then solidified to form a solid model (25). The intermediate model (25) is then put through a cleaning and evening process (26), and after assembling any desired accessory (27), final product is formed.

8 Claims, 2 Drawing Sheets

METHOD FOR PRODUCING COLORED SCULPTURESQUE POLYRESIN MODEL AND PRODUCT PRODUCED THEREBY

BACKGROUND OF THE INVENTION

1. Field of the Invention

The present invention relates to a colored sculpturesque polyresin model and the method to produce the same, and particularly to the colored sculpturesque model produced by special processes having a appearance with the sense of realization and delicate.

2. Description of Related Art

Decorations are usually in use for artistic reason when we are undertaking horticultural and gardening tasks. Particularly, people place mountain-like stones of suitable crafts like statues to be put beside planted trees and flowers to meet the predetermined designing effect. But these known decorating materials are usually made by handiwork and are expensive and hardly available. Therefore, it is hard for a designer to shape the suitable material he or she used into a gardening design.

It is known that the product of polyresin material is characterized by low cost and easy mass production. The light weight of a polyresin product will very helpful for the carrying and other work of gardening. Therefore polyresin reproduction of crafts like stone statues or carvings is now available to make horticultural or gardening decoration easier and cheaper. The conventional method to produce the polyresin reproduction is shown in FIG. 1. First, a prototype 11 made of clay is made and shaped by carving, sculpturing or other necessary treatment to make sure of the details and final shape of prototype 11. Then the prototype 11 is used to make a first-step mold 12. The raw material of polyresin mixture 13 is mixed into a liquid phase to be injected into the first-step mold. The polyresin mixture 13 in the first-step mold is then hardened to a solid model 14 as desired. The solid model is cleaned and evened 15 after the forming process and is then colored or painted 16 with predetermined patterns. After that, the final product is assembled, and any necessary accessory 17 is added, and the product is painted, yielding a final product 18. The conventional method to mass-produce the polyresin reproduction is shown in the FIG. 1. First, a prototype 11 made of clay is made and shaped by carving, sculpturing or other necessary treatment to make sure of the details and final shape of prototype 11. Then the shape of said prototype 11 makes a first-step mold 12. And raw material of polyresin mixture 13 is mixed into liquid phase for the use of injecting into the first-step mold. The polyresin mixture 13 in the firs-step mold is then waited to solidify a solid model 14 as desired. The solid model should be cleaned and evened 15 after the forming process and is then colored or painted 16 with predetermined patterns. After that, the final product is then assembled the necessary accessory 17 by the original design and painted by conventional coloring way. At last, a final product 18 is to by made.

However, the afore-mentioned conventional method still leaves some problems to the outlook of the final products to be improved. First of all, according to the conventional method, if a conventional producer plans to create the first-step mold, only two kinds of clay can be used to from the prototype. However the softness of oily clay is usually causes the difficulty of delicate carving or sculpturing. On the other hand, aqueous clay. Oily clay is easier to shape. can keep the delicate carved profile or patterns for a longer period. But aqueous is prone to gradually lose water it contains. Because of losing its water, the prototype made of aqueous clay is apt to crack and the following processes will fail. Another problem to the conventional method is way of coloring or painting. Traditional step to color is to be taken after the non-colored polyresin mixture solidified and polished. The conventional coloring takes too much time to paint on the final products and it is understanding that such a step should be hand-working. Therefore, it results in expensive cost and time wasting. Besides, the painting or coloring will be unnatural because of the polyresin material itself and the later added color.

Accordingly, what is desired to develop a cheaper and timesaving method contains fewer steps to produce the colorful polyresin sculpturesque. And by implementing the new method, the final product is more delicate and natural due to the simplified and fast processes.

SUMMARY OF THE INVENTION

Accordingly, the purpose of the present invention is to provide a producing method, which uses less, steps in manufacturing process and can get more delicate and natural final product by changing the ingredient in the process of forming a polyresin products.

Another purpose of the present invention is to provide a producing method which combines and simplifies several process steps to make timesaving and cost-down be possible.

A third purpose of the present invention is to provide an easier way to mass-produce different polyresin products in garden design or horticultural use and enriches the material of the gardening decoration.

In order to achieve the objects set forth, a new method for producing colored polyresin sculpturesque products includes the following steps. First, a prototype is made of sandstone by carving, shaping, and other similar treatments. Then a first-step mold is made according to the shape of the prototype. Polyresin, hardeners, sand, cement, and desired colored powder are mixed in a liquid phase. The mixture is the raw material of polyresin sculpturing. The polyresin mixture in a liquid phase is then injected into the first-step mold. Then, the liquid polyresin mixture in the mold solidifies and forms an intermediate product. Finally, the intermediate product is cleaned and evened, and after assembling any desired accessory, a final product is formed.

Other objects, advantages and novel features of the invention will become more apparent from the following detailed description when taken in conjunction with the accompanying drawings.

DETAILED DESCRIPTION OF THE INVENTION

Figure 1:
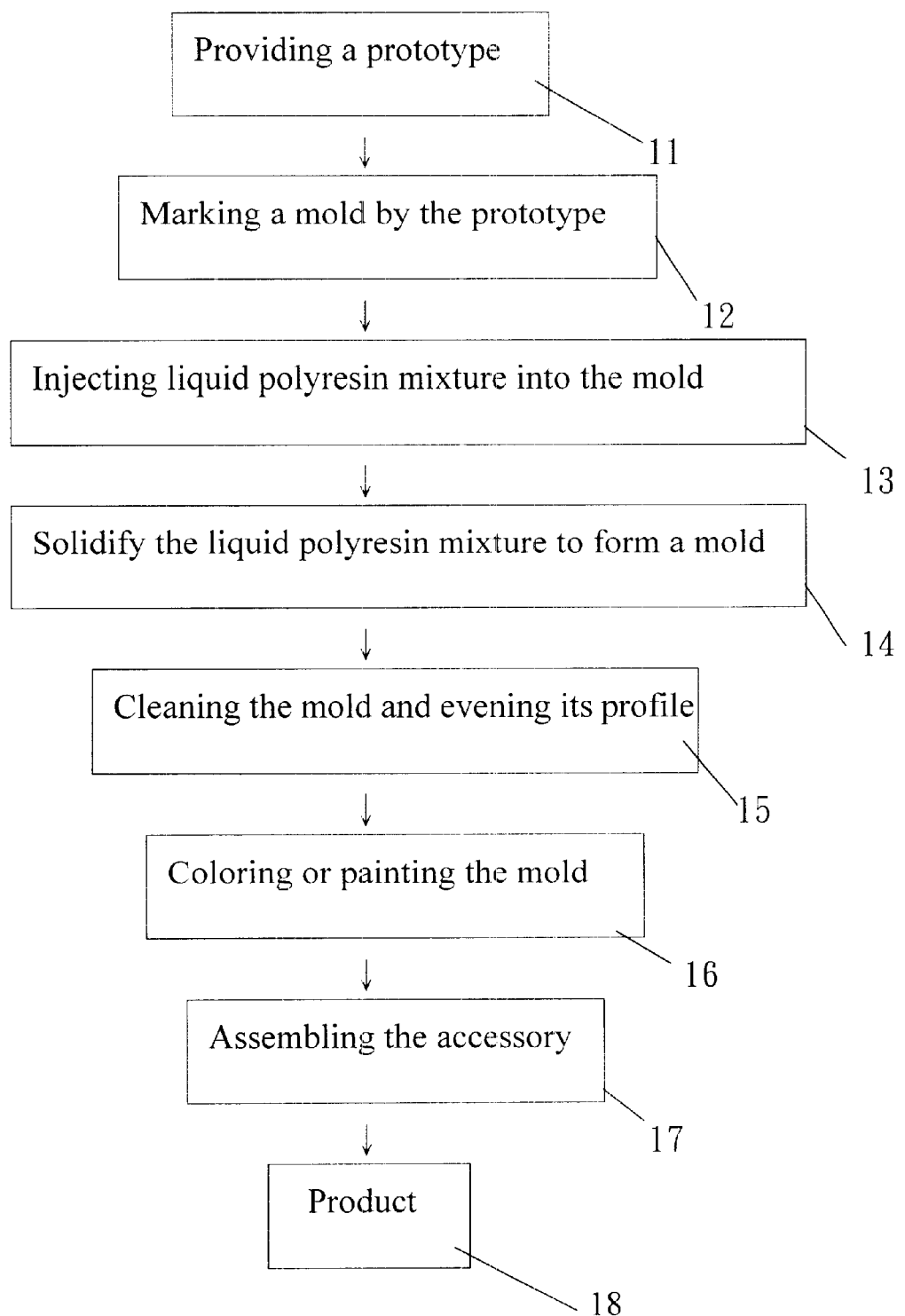
FIG. 1 is a schematic representation for a conventional method to produce a sculpturesque polyresin model in horticultural use.

Reference will now be made to the drawing figure to describe the present invention detail.

Figure 2:
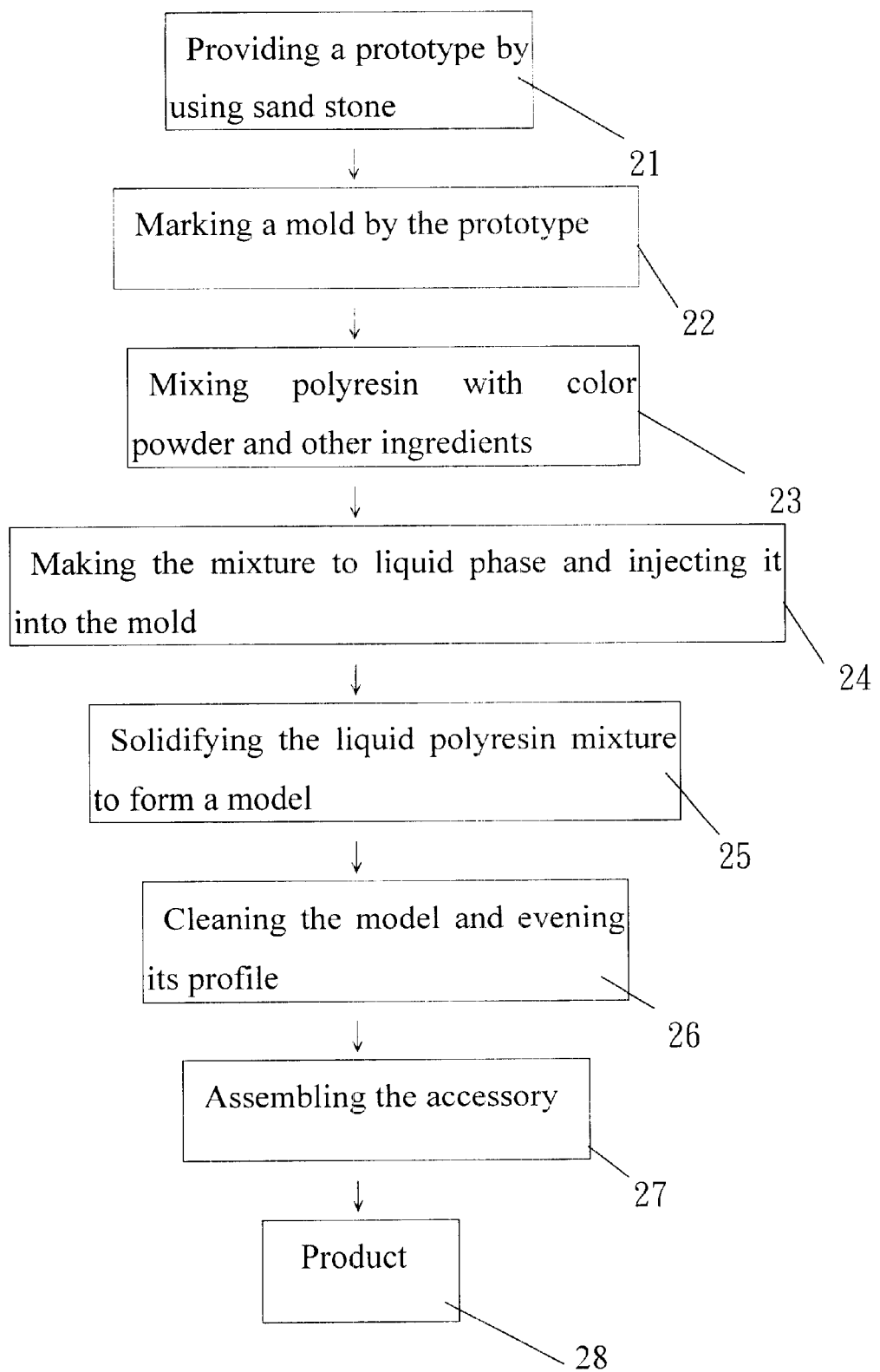
FIG. 2 is a schematic representation for a preferred embodiment of the method in accordance with the present invention.

Referring to FIG. 2, the method to produce sculpturesque polyresin models for horticulture use includes the following steps. First, a prototype 21 is made from sandstone by carving, sculpturing, or other necessary treatment. The sandstone is hard enough to keep the desired final shape of the prototype 21. Therefore, by using the sandstone, any delicate carving or pattern on the prototype 21 has better endurance when undergoing processing. Then an intermediate mold 22 is made according to the shape of the prototype 21. Usually one kind of soft silicon material mixed with gypsum is used to copy the profile of said prototype and then a mass-producing mold is made according to the profile copy. After that, several ingredients including different colored powders are mixed together. Differing from the conventional methods, the raw material of sculpturesque polyresin models includes not only polyresin and some hardeners, but also sand, cement, and desired colored powders. Sand and cement is used to create in the final product a feel very similar to real stone. The desired color powder is mixed at the outset to directly color the final product and to simplify the hand-painting process. The polyresin mixture 23 is then liquified to a liquid phase 24 so that the liquid mixture can be injected into the first-step mold. The liquid polyresin mixture 23 in the mold is solidified to form a solid intermediate product 25. Due to the sand, cement, and colored powders, the intermediate product 25 has more delicate and natural features and is colored at the mixture and solidification step. The intermediate model 25 is then taken through the cleaning and evening process 26 after the forming process. After assembling any desired accessory 27, a final product 28 is produced.

It is obvious that due to add color powder directly to the mixture, the coloring process is finished at the same time as forming process. Therefore the hand-working process of coloring or painting will be cancelled and the whole time of producing the model 25 is saved. And it is easier to get a natural and fine product by this method rather than the conventional one.

It is to be understood, however, that even though numerous characteristics and advantages of the present invention have been set forth in the foregoing description, together with details of the method and function of the invention, the disclosure is illustrative only, and changes may be made in detail, especially in matters of ingredient, material, and arragement of steps within the principles of the invention to the full extent indicated by the broad general meaning of the terms in which the appended claims are expressed.

What is claimed is:

1. A method to produce sculpturesque polyresin models including the following steps:
   a) forming a prototype from sand stone;
   b) making a mold from said prototype;
   c) mixing predetermined ingredients including polyresin and at least one colored powder into a liquified mixture; and
   d) reforming said mixture into a desired model.
2. The method as described in claim 1, wherein:
said prototype is carved or sculptured.
3. The method as described in claim 1, wherein:
said mixture includes sand.
4. The method as described in claim 1, wherein:
said mixture includes cement.
5. The method as described in claim 1, wherein:
said reforming process includes the process of liquefying said mixture.
6. The method as described in claim 1, wherein:
said reforming process includes the process of solidifying the liquid mixture to form said model.
7. The method as described in claim 1, wherein:
after said reforming process, a cleaning process is used to clean a surface of said model.
8. The method as described in claim 1, wherein:
after said reforming process, an assembly process is used to assemble said model with a desired accessory.

* * * * *